Jan. 12, 1960 E. M. WOLF 2,920,454
APPARATUS FOR PROTECTING OFFSHORE STRUCTURES
Filed Dec. 7, 1953
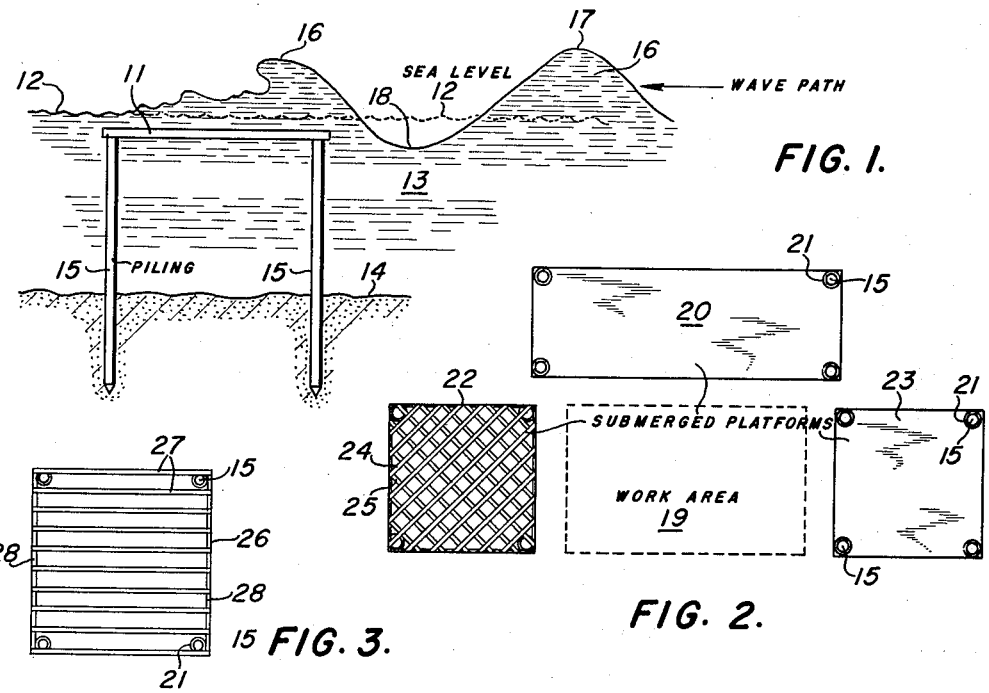
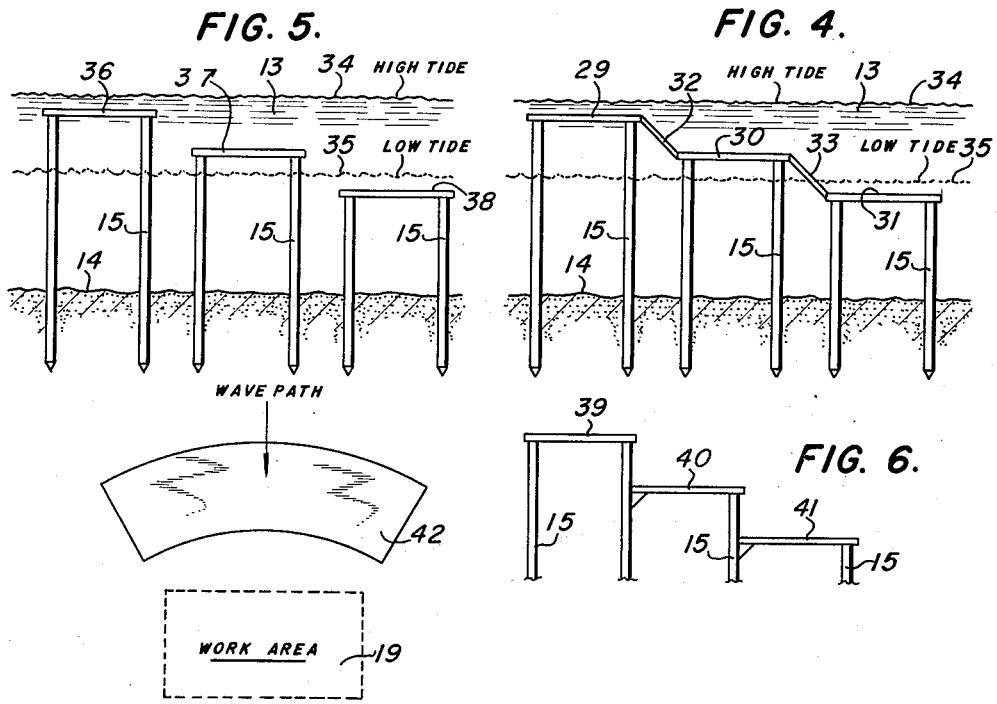

United States Patent Office 2,920,454
Patented Jan. 12, 1960

2,920,454
APPARATUS FOR PROTECTING OFFSHORE STRUCTURES

Edwin M. Wolf, Bellaire, Tex.

Application December 7, 1953, Serial No. 396,719

19 Claims. (Cl. 61—4)

The present invention is directed to method and apparatus for protecting an offshore area and/or structures from wave action. More particularly, the invention is directed to apparatus for reducing wave height in bodies of water. In its more specific aspects, the invention is concerned with a method and means for reducing the height of waves before they come into contact with a structure or area having an elevation above the surface of a body of water.

The invention may be briefly described as apparatus for protecting an area exposed to wave action in a body of water which comprises at least a submerged barrier member defining a surface with its major dimension on a horizontal plane. The barrier member is arranged in the water at or below still water level in the path of the waves and is anchored by fixed anchoring means to the bottom of the body of water in fixed relationship to the bottom and to the area to be protected.

The barrier member of the present invention is suitably a horizontal platform which is located at or below normal still water level and may comprise a plurality of such barrier members arranged in spaced apart relationship with the area to be protected. The barrier member may be an uninterrupted plane surface defining a submerged platform or it may be constructed of spaced apart members, such as elongated members or constructed of a grillwork.

The barrier members may be arranged such that one or more barrier members will protect the offshore area or structure at high tide level and one or more barrier members will serve to protect the area at low tide conditions. Thus, in accordance with my invention, I may provide a plurality of such barrier members arranged at varying distances below the maximum high tide and minimum low tide level.

It is contemplated that the barrier members may be interconnected by stepped off connections which may be on an oblique angle or on a right angle. The length of the barrier depends upon the size of the area to be protected.

The width of the horizontal surface of the barrier and the distance it is placed below the still water level depends upon the extent to which the wave heights are to be reduced. Maximum reduction is obtained when the width of the horizontal plane approaches the distance of the maximum wave length to be encountered and the barrier is placed at or just below still water level. Thus the width of the barrier and the distance below the still water level where it is to be placed will be determined by the extent of reduction desired. Where work is being performed in an open area, a fractional reduction is ordinarily sufficient and the barrier may be below still water level a distance depending on the degree reduction desired and the water depth. For maximum reduction the barrier member should be at still water level.

The anchoring means of the present invention may be suitable piling attached to the horizontal barrier member and driven in the bottom of the sea or the bottom of the body of water wherein the area to be protected is located. For example, the horizontal barrier member may be provided with tubular conduits and piling driven through the tubular conduit at sea level.

The invention will be further illustrated by reference to the drawing in which:

Fig. 1 illustrates a single horizontal barrier member and shows the breaking of a wave over the horizontal barrier member and the wave form reduced in height;

Fig. 2 shows a plurality of submerged horizontal barrier members arranged to protect a work area in a body of water;

Figs. 2 and 3 show an embodiment where the barrier member is composed of spaced apart members;

Fig. 4 illustrates a plurality of horizontal barrier members interconnected by a sloping surface at an oblique angle;

Fig. 5 illustrates a plurality of horizontal barrier members of varying heights below maximum high tide and minimum low tide level;

Fig. 6 is a modification of the apparatus of Fig. 4; and

Fig. 7 is a further variation of the apparatus Figs. 1 to 6 and shows a curvilinear submerged barrier member arranged to protect a work area or structure.

Referring now to the drawing in which identical parts will be disignated by identical numerals, numeral 11 designates a horizontal barrier member arranged below the still water level 12 of a body of water 13. The horizontal barrier member is connected to the bottom 14 of the body of water 13 by means of pilings 15 which are connected to the horizontal barrier member 11 and to the bottom 14. These pilings may suitably be driven in the bottom 14 and the barrier member constructed thereon or attached thereto after submergence.

Fig. 1 shows a wave 16 having a crest 17 and a trough 18 travelling in the direction indicated by the arrow and further shows the breaking of the wave 16 over the barrier member 11.

Referring now to Fig. 2, 19 is an area in a body of water for which protection is desired. A rectangular platform 20 is submerged below the surface 12 of the body of water 13 and arranged with its maximum length facing the direction from which waves normally approach the area to be protected. It is understood that plural numbers of platforms may be arranged end to end to each other to extend the size of the area to be protected. Pilings 15 may be driven through conduits 21 into the bottom of the sea, as shown with respect to Fig. 1.

For example, if the size of the work area is approximately 200 feet square, the barrier 20 may have a length of approximately 250 feet and a width of approximately 50 feet. The protected area extends within the confines of the longitudinal dimension of the barrier 20 for a distance insufficient for the wave to re-form. This latter distance may vary depending on the length of the barrier 20 but usually may be a distance approximately equal to the length of the barrier 20.

Arranged on each side of area 19 are second and third rectangular platforms 22 and 23. Platform or barrier member 23 may be similar to barrier member 20 but may be of different dimensions and is arranged so that there is an overlapping of the protection of the barrier members 20 and 22. The barrier member 22 may be similarly constructed as barrier members 20 and 23 but also may be constructed of spaced apart members 24 and 25 which may form a honeycomb or grill pattern. These members may suitably be iron grillwork or woodwork or the like. It is to be understood that the barrier members 20, 22 and 23 may be constructed similarly or differently to form a plane uninterrupted surface or a surface composed of spaced apart members, such as the barrier member 22. Re-forming or regrouping of the waves may be reduced or eliminated by positioning barriers 22 and 23 with respect to work area 19, as shown.

Barrier members 20, 22, and 23 arranged in this manner gives the work area protection in three quadrants. Protection on all four quadrants may be obtained by suitably placing a fourth barrier with respect to area 19 such that it is substantially surrounded by barriers as illustrated. However, it may be unnecessary to provide a barrier on the landward side of the work area in view of the shelving nature of the sea floor.

Referring now to Fig. 3, a submerged barrier member 26 is composed of elongated spaced apart members 27 which are secured together by members 28. The barrier member 27, like the other barrier members 11, 20, 22 and 23 may be anchored to the bottom of the sea by means of piling 15 in conduits 21.

Referring now to Fig. 4, it will be noted that a plurality of stepwise barrier members 29, 30 and 31 are provided which are anchored to the bottom 14 by means of piling 15. This stepwise or stepped arrangement where the barrier members 29, 30 and 31 are interconnected by sloping members 32 and 33 are designed to allow protection for maximum high tide level 34 and for minimum low tide level 35 of the body of water 13.

The arrangement of Fig. 5 is somewhat similar to that of Fig. 4 but shows an arrangement of platforms 36, 37, and 38 anchored to the bottom 14 by means of pilings 15. These platforms 36, 37 and 38 provide protection for a work area 19, such as illustrated in Fig. 2, for maximum high tide level 34 and minimum low tide level 35.

The device of Fig. 6 provides a plurality of platforms 39, 40, and 41 which may be supported and anchored by pilings 15 like the other platforms which have been described.

It will be clear from the drawing and description that the submerged barrier members are arranged parallel to still water level and are spaced vertically from the underlying land bottom. Also, it is apparent that the anchoring means or piling present a vertical surface relatively small compared to the horizontal surface of the barrier members which they anchor in place.

Another type of submerged barrier member is one having a curvilinear surface, such as platform 42, illustrated in Fig. 7 which is arranged to protect a work area, such as 19, the barrier member 42 being arranged in the wave path to the work area or platform 19 such that the curvilinear barrier member 42 provides the protection which a plurality of barrier members are designed to give.

As stated, the submerged horizontal barrier member of the present invention serves to reduce wave action. The horizontal barrier member presenting a substantially large horizontal surface creates, in effect, an artificial sea bottom. It is axiomatic that waves cannot exceed the depth of the water in which they are formed.

As an idea of the magnitude of wave forces, it has been indicated that waves having a height of 14 feet and 150 feet long when striking a fixed vertical structure may exert a pressure of about 5 tons per square foot. It may be easily seen that such a force exerted on a platform or other structure in a body of water presenting a vertical surface exposed to wave action can be quickly and easily destroyed by the force of the waves. By practicing the present invention whereas the effective depth of the water in which the wave travels is decreased and by increasing the steepness of a wave sufficiently the wave will be caused to break thereby reducing the energy of the wave.

The present invention causes the waves to break by presenting a surface which is similar to the effect on the wave as when it approaches shallow water, such as a shoal or beach. My invention thus decreases artificially near an offshore area the water depth and causes the waves to be reduced to an ineffective height allowing protection to an offshore area.

The present invention is directed to protecting any kind of structure presenting a surface above the normal still water level. Thus the present invention may be directed to protecting platforms constructed in a body of water in which waves of substantial size, force and magnitude are generated. It is frequently necessary to conduct operations away from land from such structures like platforms. For example, oil well drilling operations are frequently conducted from such platforms. The invention is also useful in protecting navigational aids, such as beacons, buoys, and the like, as well as defense structures which suitably may be mounted in a body of water.

In the present invention in which a horizontal barrier is formed and anchored in the path of waves to a structure, the anchoring means, such as piling, presents an area to the water travelling against it relatively small in comparison with the area presented by the horizontal barrier. Thus the moving water may pass freely under and above the barrier member yet the barrier member interfering with the orbital motion of the waves. Likewise, with a spaced apart horizontal barrier the water breaking over the surface of the horizontal barrier may dissipate its energy or weight through the spaced apart members and preventing the destruction thereof.

Thus the present invention is practiced by forming or providing a horizontal plane surface submerged beneath the normal still water level of the surface of a body of water in the path of waves to an area to be protected and anchoring said structure in fixed relationship to the bottom of the body of water. By providing said submerged plane surface, the waves travelling over the barrier are caused to break completely or at least partially such that the tremendous forces exerted by the waves of normal height are dissipated or reduced to an extent where they will not destroy or damage the structure when coming into contact with same.

The nature and objects of the present invention having been completely described and illustrated, what I wish to claim as new and useful and to secure by Letters Patent is:

1. Apparatus for protecting an area exposed to wave action in a body of water which comprises at least one submerged barrier member defining a plane horizontal surface arranged in said body of water in the path of waves normal to said area just below still water level, said horizontal surface of said barrier member being parallel to still water level and being spaced vertically from the underlying bottom of said body of water such that water passes freely over and under said surface to reduce the height of waves passing over said submerged barrier member and rigid anchoring means fixedly connected to said barrier member for anchoring said barrier member in fixed relationship to the underlying bottom of said body of water, said anchoring means presenting a vertical surface relatively small in comparison to the horizontal surface of said barrier member.

2. Apparatus in accordance with claim 1 in which the horizontal surface of the barrier member comprises a plurality of spaced apart members forming a grill pattern through which water may flow.

3. Apparatus in accordance with claim 1 in which the barrier member is rectangular.

4. Apparatus in accordance with claim 1 in which the barrier member is curvilinear.

5. Apparatus for protecting a structure exposed to wave action in a body of water which comprises a plurality of submerged barrier members each defining a plane horizontal surface arranged in said body of water in the path of waves normal to said structure just below still water level, the horizontal surfaces of said barrier members being parallel to still water level and being spaced vertically from the underlying bottom of said body of water such that water passes freely over and under said surfaces to reduce the height of waves passing over said submerged barrier members, and rigid anchoring means fixedly connected to said barrier members for anchoring each of said barrier members in fixed relationship to the underlying bottom of said body of water, said anchoring means presenting vertical surfaces relatively small in comparison to the horizontal surfaces of said barrier members, said submerged barrier members being located a sufficient distance from said structure to break said waves before they reach said structure.

6. Apparatus in accordance with claim 5 in which the submerged barrier members are arranged generally surrounding said structure on at least two sides.

7. Apparatus for conducting offshore drilling in a body of water protected from wave action which comprises, in combination, a platform for conducting well drilling operations arranged offshore in said body of water, at least one submerged barrier member defining a surface on a horizontal plane arranged in said body of water just below still water level in the path of waves normal to said platform a sufficient distance from said platform, the surface on a horizontal plane being parallel to still water level and being spaced vertically from the underlying bottom of said body of water such that water passes freely over and under said surface on a horizontal plane, said barrier member presenting only said horizontal surface to reduce the height of said waves passing over said submerged barrier member and being an insufficient distance from said platform for the waves to reform before reaching said platform and rigid anchoring means fixedly connected to said barrier member for anchoring said barrier member in fixed relationship to the underlying bottom of said body of water, said anchoring means presenting a vertical surface relatively small in comparison to the horizontal surface of said barrier member.

8. Apparatus in accordance with claim 7 in which the horizontal surface of the barrier member comprises a plurality of spaced apart members forming a grill pattern through which water may flow.

9. Apparatus in accordance with claim 7 in which the barrier member is rectangular.

10. Apparatus in accordance with claim 7 in which the barrier member is curvilinear.

11. Apparatus in accordance with claim 7 in which the submerged barrier member is arranged in said body of water a distance from said platform approximately equal to the length of the barrier member.

12. Apparatus for conducting offshore drilling in a body of water protected from wave action which comprises, in combination, a platform for conducting well drilling operations offshore in said body of water, at least one submerged rectangular barrier member defining a surface on a horizontal plane arranged in said body of water in the path of waves normal to said platform just below still water level a distance from said platform approximately equal to the length of the barrier member and an insufficient distance therefrom for waves to reform, said barrier member presenting only said horizontal surface to reduce the height of waves passing over said submerged barrier member, the surface on a horizontal plane being parallel to still water level and being spaced vertically from the underlying bottom of said body of water such that water passes freely over and under said surface on a horizontal plane, and piling driven in the underlying bottom of said body of water fixedly connected to said submerged barrier member to anchor said barrier member in fixed relationship to said platform and said underlying bottom of said body of water, said piling presenting a surface relatively small in comparison to the horizontal surfaces of the barrier members.

13. Apparatus for protecting an area exposed to wave action in a body of water which comprises a plurality of stepped submerged horizontal barrier members each defining a surface on a horizontal plane arranged in said body of water with one of said horizontal barrier members being first in the path of waves normal to said area just below still water level of minimum low tide and with another of the horizontal barrier members being last in the path of waves to said area just below still water level of maximum high tide, said surfaces on a horizontal plane each being parallel to still water level and being spaced vertically from the underlying bottom of said body of water, the first barrier member having its horizotnal surface parallel to still water level of minimum low tide and the last barrier member having its horizontal surface parallel to still water level of maximum high tide, said barrier members presenting only said horizontal surfaces to reduce the height of waves passing over said submerged horizontal barrier members, and rigid anchoring means fixedly connected to each of said barrier members for anchoring each of said horizontal barrier members to the underlying bottom of said body of water presenting a vertical surface relatively small in comparison to the horizontal surface of said horizontal barrier members such that water may flow freely over and under each of said horizontal barrier members.

14. Apparatus in accordance with claim 13 in which the horizontal surface of the one horizontal barrier member first in the path of waves to said area comprises a plurality of horizontally spaced apart members forming a grill pattern through which water may flow.

15. Apparatus in accordance with claim 13 in which the horizontal surface of said another horizontal barrier member last in the path of waves to said area comprises a plurality of horizontally spaced apart members forming a grill pattern through which water may flow.

16. Apparatus in accordance with claim 13 in which the horizontal surface of at least one of the horizontal barrier members in the path of waves to said area comprises a plurality of horizontally spaced apart members forming a grill pattern through which water may flow.

17. Apparatus for protecting a structure exposed to wave action in a body of water which comprises a plurality of stepped submerged barrier members each defining a surface on a horizontal plane arranged in said body of water in the path of waves normal to said structure just below still water level, said barrier members presenting only said horizontal surfaces to reduce the height of waves passing over said submerged barrier members, at least one of said submerged barrier members being arranged just below still water level of minimum low tide, at least said one barrier member being parallel to still water level of minimum low tide and being spaced vertically from the underlying bottom of said body of water such that water passes freely over and under said horizontal surfaces, and rigid anchoring means fixedly connected to each of said barrier members for anchoring each of said barrier members to the underlying bottom of said body of water presenting a vertical surface relatively small in comparison to the horizontal surface of said barrier members, said submerged barrier members being located a sufficient distance from said structure to break said waves before they reach said structure.

18. Apparatus for protecting a structure exposed to wave action in a body of water which comprises a plurality of stepped submerged barrier members each defining a surface on a horizontal plane arranged in said body of water in the path of waves normal to said structure just below still water level, said barrier members presenting only said horizontal surfaces to reduce the height of waves passing over said submerged barrier members, at least one of said submerged barrier members being arranged just below still water level of maximum high tide, at least said one barrier member being parallel to still water level of maximum high tide and being spaced vertically from the underlying bottom of said body of water such that water passes freely over and under said horizontal surfaces, and rigid anchoring means fixedly connected to each of said barrier members for anchoring each of said barrier members to the underlying bottom of said body of water presenting a vertical surface relatively small in comparison to the horizontal surface of said barrier members, said submerged barrier members being located a sufficient distance from said structure to break said waves before they reach said structure.

19. Apparatus for protecting an area exposed to wave action in a body of water which comprises at least one submerged barrier member defining a plane horizontal surface arranged in said body of water in the path of waves normal to said area, just below still water level, said horizontal surface of said barrier member being parallel to still water level and being spaced vertically from the underlying bottom of said body of water such that water passes freely over and under said surface to reduce the height of waves passing over said submerged barrier member and piling driven in the underlying bottom of said body of water fixedly connected to said barrier member for anchoring said barrier member in fixed relationship to the underlying bottom of said body of water, said piling presenting a vertical surface relatively small in comparison to the horizontal surface of said barrier.

References Cited in the file of this patent

UNITED STATES PATENTS

| | | |
|---|---|---|
| 2,185,458 | Giliasso | Jan. 2, 1940 |
| 2,584,867 | Guarin | Feb. 5, 1952 |
| 2,710,505 | Magill | June 14, 1955 |

FOREIGN PATENTS

| | | |
|---|---|---|
| 941 | Great Britain | 1854 |
| 5,336 | Great Britain | 1883 |
| 607,890 | France | Apr. 9, 1926 |
| 160,988 | Switzerland | June 16, 1933 |
| 676,082 | Great Britain | July 23, 1952 |